US007841175B2

(12) United States Patent
Koo

(10) Patent No.: US 7,841,175 B2
(45) Date of Patent: Nov. 30, 2010

(54) HYDRAULIC CIRCUIT FOR CONSTRUCTION EQUIPMENT

(75) Inventor: Bon Seok Koo, Kyungsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 468 days.

(21) Appl. No.: 12/077,517

(22) Filed: Mar. 19, 2008

(65) Prior Publication Data

US 2008/0236154 A1 Oct. 2, 2008

(30) Foreign Application Priority Data

Mar. 30, 2007 (KR) ..................... 10-2007-0031465

(51) Int. Cl.
*F16D 31/02* (2006.01)

(52) U.S. Cl. ............................. 60/421; 60/484; 60/486

(58) Field of Classification Search .................. 60/421, 60/422, 429, 484, 486
See application file for complete search history.

(56) References Cited

U.S. PATENT DOCUMENTS 4,210,061 A * 7/1980 Bianchetta .................. 60/484
5,692,377 A * 12/1997 Moriya et al. ................. 60/421
6,148,548 A * 11/2000 Tohji ........................... 60/421
6,430,922 B2 * 8/2002 Tohji ........................... 60/421
7,721,538 B2 * 5/2010 Koo ............................ 60/422
2003/0089106 A1 5/2003 Ioku et al.
2004/0154294 A1 8/2004 Jeon

FOREIGN PATENT DOCUMENTS

EP 1 598 561 11/2005
JP 4-203033 7/1992

OTHER PUBLICATIONS

Patent Abstracts of Japan of JP 4-203033 dated Jul. 23, 2992.

* cited by examiner

*Primary Examiner*—Michael Leslie
(74) *Attorney, Agent, or Firm*—Ladas & Parry LLP

(57) ABSTRACT

A hydraulic circuit for construction equipment is disclosed, which can prevent an abrupt rotation of a swing device when a switching valve for the swing device is shifted in a state that switching valves for a traveling device and a working device have been shifted.

5 Claims, 5 Drawing Sheets

HYDRAULIC CIRCUIT FOR CONSTRUCTION EQUIPMENT

CROSS-REFERENCE TO RELATED APPLICATION

This application is based on and claims priority from Korean Patent Application No. 10-2007-0031465, filed on Mar. 30, 2007 in the Korean Intellectual Property Office, the disclosure of which is incorporated herein in its entirety by reference.

BACKGROUND OF THE INVENTION

1. Field of the Invention

The present invention relates to a hydraulic circuit for construction equipment, which can supply hydraulic fluid from a hydraulic pump to a working device through a confluence switching valve when switching valves for a traveling device and a working device, such as a boom, an arm, or the like, are shifted in a hydraulic system in which a plurality of hydraulic pumps are used.

More particularly, the present invention relates to a hydraulic circuit for construction equipment, which can prevent an abrupt operation of a working device, such as a swing device or an option device, when a switching valve for the corresponding working device is shifted in a state that a confluence switching valve has been shifted, i.e., in a state that switching valves for a traveling device and a working device have been shifted.

2. Description of the Prior Art

Generally, in a hydraulic circuit for construction equipment such as an excavator, at least one hydraulic pump and a confluence circuit are installed to supply hydraulic fluid from the hydraulic pump to a traveling device and a working device. Accordingly, when the working device except for the traveling device is driven, hydraulic fluid in the hydraulic pump is supplied to the working device through the confluence circuit to secure a smooth operation of the working device.

Referring to FIGS. 1 and 2, a conventional hydraulic circuit for construction equipment includes first to fourth hydraulic pumps P1, P2, P3, and P4 connected to an engine; first switching valves 1 and 2 composed of valves installed in a flow path of the first hydraulic pump P1 and shifted to control hydraulic fluid fed to working devices, such as a boom, an arm, and the like; second switching valves 5 and 6 composed of valves installed in a flow path of the second hydraulic pump P2 and shifted to control hydraulic fluid fed to the working devices; third switching valves 7 and 8 composed of valves installed in a flow path of the third hydraulic pump P3 and shifted to control hydraulic fluid fed to a swing device; fourth switching valves 3 and 4 composed of valves installed on upstream sides of the flow paths of the first and second hydraulic pumps P1 and P2, respectively, and shifted to control hydraulic fluid fed to left and right traveling devices; and a confluence switching valve 9 installed on a downstream side of the flow path of the third hydraulic pump P3 and shifted to supply the hydraulic fluid from the third hydraulic pump P3 to the working devices on the first hydraulic pump side P1 through a first confluence line 12 and to the working devices on the second hydraulic pump side P2 through a second confluence line 13, in response to a pilot signal pressure formed in a signal line 17 connected to the fourth hydraulic pump P4.

In order to form a signal pressure in the signal line 17, first and second throttling parts 19 and 20 are installed in the flow path of the fourth hydraulic pump P4. A signal line 15 for the traveling device connected to the signal line 17 is connected to a hydraulic tank through the fourth switching valves 3 and 4 for the traveling devices, and is connected to one side of a first valve 21.

A signal line 16 for the working device, which forms a signal pressure in the signal line, is connected to the signal line 17 on the downstream side of the second throttling part 20, is connected to the hydraulic tank through the first and second switching valves 1, 2, 5, and 6 for the working devices of the first and second hydraulic pumps P1 and P2, and is connected to the other side of the first valve 21.

In a traveling mode, the hydraulic fluid from the first hydraulic pump P1 is supplied to a right traveling motor by the shifting of the fourth switching valve 3, and the hydraulic fluid from the second hydraulic pump P2 is supplied to a left traveling motor by the shifting of the fourth switching valve 4.

In the signal line 15 for the traveling device that is blocked when the fourth switching valves 3 and 4 are shifted, a signal pressure is formed by the first throttling part 19. Accordingly, the first valve 21 is shifted in the right direction as shown in the drawing (at this time, the signal line 16 and the tank line 18 are blocked). If the first and second switching valves 1, 2, 5, and 6 for the working devices connected to the first and second hydraulic pumps P1 and P2 are not shifted, the signal pressure is not formed in the signal line 16 for the working devices.

That is, the signal pressure is not formed in the signal line 17, and thus the confluence switching valve 9 is not shifted, but is kept in its initial state.

When the fourth switching valves 3 and 4 for the traveling devices are shifted and a part of the switching valves 1, 2, 5, and 6 for the working devices is shifted, signal pressure is formed in the signal lines 15 and 16 by the first and second throttling parts 19 and 20. Accordingly, the confluence switching valve 9 is shifted in the right direction, as shown in the drawing, by the signal pressure formed in the signal line 17.

When the confluence switching valve 9 is shifted, a part of the hydraulic fluid from the third hydraulic pump P3 joins the working devices such as a boom, an arm, and the like, on the first hydraulic pump side P1 through the first confluence line 12. Also, a part of the hydraulic fluid from the third hydraulic fluid P3 joins the working devices on the second hydraulic pump side P2 through the second confluence line 13.

Accordingly, even in the case of driving the working devices during traveling, the working devices can be operated at a specified speed as the straight traveling is secured.

In the conventional hydraulic circuit, by shifting the fourth switching valves 3 and 4 for the traveling devices and at least one of the first and second switching valves 1, 2, 5, and 6 for the working devices, the confluence switching valve 9 is shifted by the signal pressure formed in the signal line 17. Accordingly, the hydraulic fluid from the third hydraulic pump P3 joins the first and second confluence lines 12 and 13.

If a center bypass 11 of the third hydraulic pump P3 is not connected to the tank line, a load pressure corresponding to the first and second switching valves 1, 2, 5, and 6 is formed in the center bypass 11.

Accordingly, in the case of shifting the third switching valves 7 and 8 connected to the third hydraulic pump P3, the working devices, such as a swing device, an option device, and the like, connected to the third switching valves 7 and 8 operates sensitively (i.e., abruptly operates), and thus the manipulation and safety of the working devices are lowered.

SUMMARY OF THE INVENTION

Accordingly, the present invention has been made to solve the above-mentioned problems occurring in the prior art while advantages achieved by the prior art are maintained intact.

One object of the present invention is to provide a hydraulic circuit for construction equipment, which can prevent an abrupt rotation of a swing device when a switching valve for the swing device is shifted in a state that switching valves for a traveling device and a working device have been shifted in a hydraulic system including a confluence switching valve for joining and supplying hydraulic fluid from a hydraulic pump to the working device.

In order to accomplish this object, there is provided a hydraulic circuit for construction equipment, according to an embodiment of the present invention, which includes first to fourth hydraulic pumps; first switching valves composed of valves installed in a flow path of the first hydraulic pump and shifted to control hydraulic fluid fed to working devices; second switching valves composed of valves installed in a flow path of the second hydraulic pump and shifted to control hydraulic fluid fed to the working devices; third switching valves composed of valves installed in a flow path of the third hydraulic pump and shifted to control hydraulic fluid fed to working devices; fourth switching valves composed of valves installed on upstream sides of the flow paths of the first and second hydraulic pumps, respectively, and shifted to control the hydraulic fluid fed to left and right traveling devices; a confluence switching valve installed on a downstream side of the flow path of the third hydraulic pump and shifted to supply the hydraulic fluid from the third hydraulic pump to the working devices on the first hydraulic pump side and to the working devices on the second hydraulic pump side, in response to a pilot signal pressure formed in a signal line connected to the fourth hydraulic pump; a signal line for the traveling devices which is connected to the signal line for the confluence switching valve and in which a signal pressure is formed when the fourth switching valves for the traveling devices are shifted; signal lines for the working devices which are connected to the signal line for the confluence switching valve and in which a signal pressure is formed when the first and second switching valves for the working devices are shifted; a first valve having one end connected to the signal line for the traveling device and the other hand connected to an intersection between the signal line for the confluence switching valve and a tank line; and a second valve installed in a flow path between the first valve and the tank line, shifted to open the flow path to discharge pressure formed in the signal line for the confluence switching valve to the tank line, in response to a supply of the signal pressure, and shifted to block the flow path to form the signal pressure in the signal line for the confluence switching valve when the signal pressure is not supplied thereto.

In another aspect of the present invention, there is provided a hydraulic circuit for construction equipment, which includes first to fourth hydraulic pumps; first switching valves composed of valves installed in a flow path of the first hydraulic pump and shifted to control hydraulic fluid fed to working devices; second switching valves composed of valves installed in a flow path of the second hydraulic pump and shifted to control hydraulic fluid fed to the working devices; third switching valves composed of valves installed in a flow path of the third hydraulic pump and shifted to control hydraulic fluid fed to working devices; fourth switching valves composed of valves installed on upstream sides of the flow paths of the first and second hydraulic pumps, respectively, and shifted to control the hydraulic fluid fed to left and right traveling devices; a confluence switching valve installed on a downstream side of the flow path of the third hydraulic pump, connected to the fourth hydraulic pump, and shifted to supply the hydraulic fluid from the third hydraulic pump to the working devices on the first hydraulic pump side and to the working devices on the second hydraulic pump side, in response to a pilot signal pressure formed in a signal line in which a third throttling part is installed; a signal line for the traveling devices which is connected to a downstream side of the third throttling part installed in the signal line for the confluence switching valve and in which a signal pressure is formed when the fourth switching valves for the traveling devices are shifted; signal lines for the working devices which are connected to the signal line for the confluence switching valve and in which a signal pressure is formed when the first and second switching valves for the working devices are shifted; and a second valve installed to open/close a flow path between the signal line for the confluence switching valve and a tank line, shifted to open the flow path to discharge pressure formed in the signal line for the confluence switching valve to the tank line, in response to a supply of the signal pressure, and shifted to block the flow path to form the signal pressure in the signal line for the confluence switching valve when the signal pressure is not supplied thereto.

A first throttling part may be installed on an upstream side of the signal line for the traveling devices connected to the signal line for the confluence switching valve, and the signal line for the working devices may be connected to a downstream side of a second throttling part installed in the signal line for the confluence switching valve.

The second valve may further include an orifice formed in a spool in a position where the flow path is open when the second valve is shifted in response to the supply of the signal pressure thereto.

The working device connected to the third switching valve may be a swing device or an option device.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
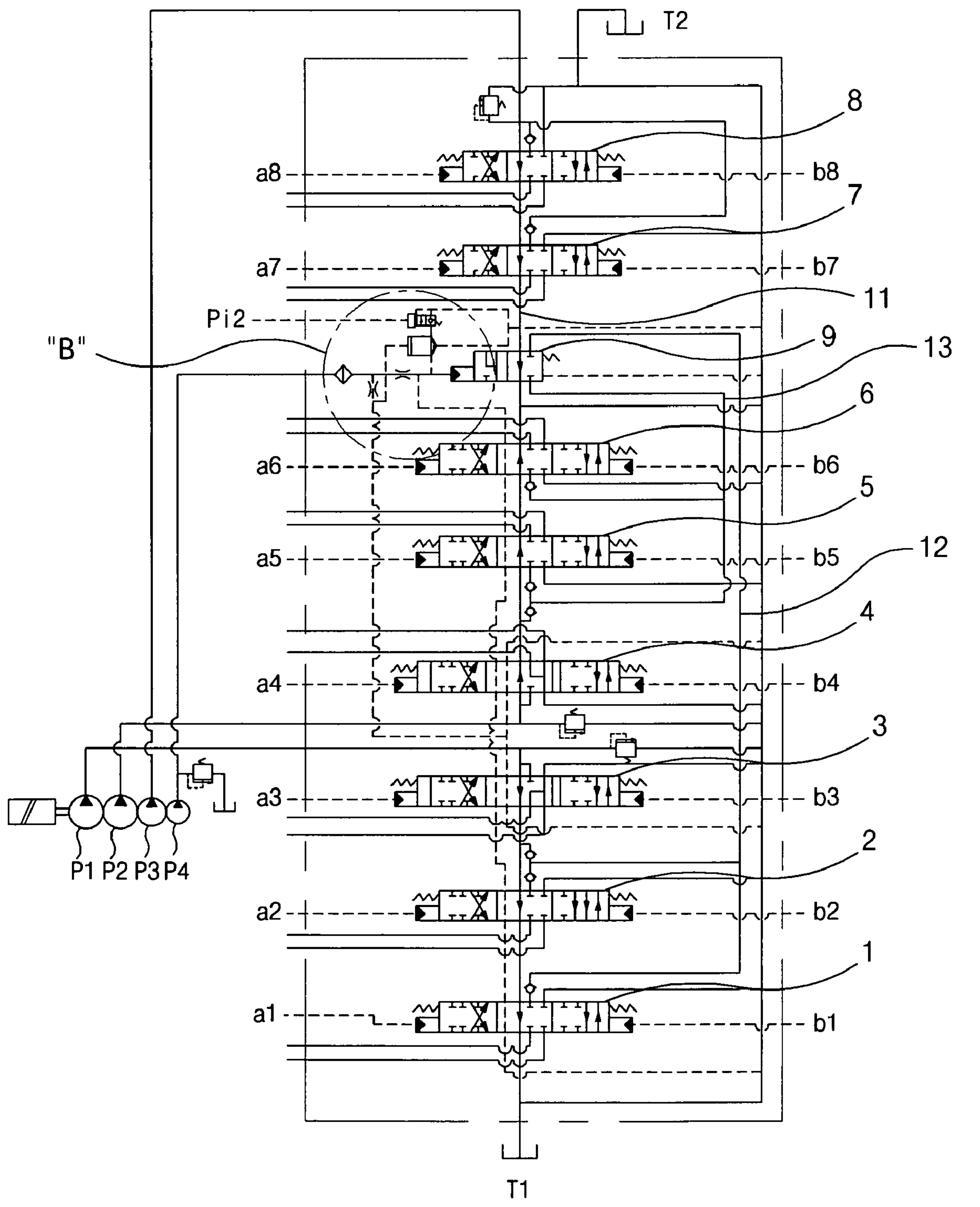
FIG. 3 is a circuit diagram of a hydraulic circuit for construction equipment according to an embodiment of the present invention.
Figure 4:
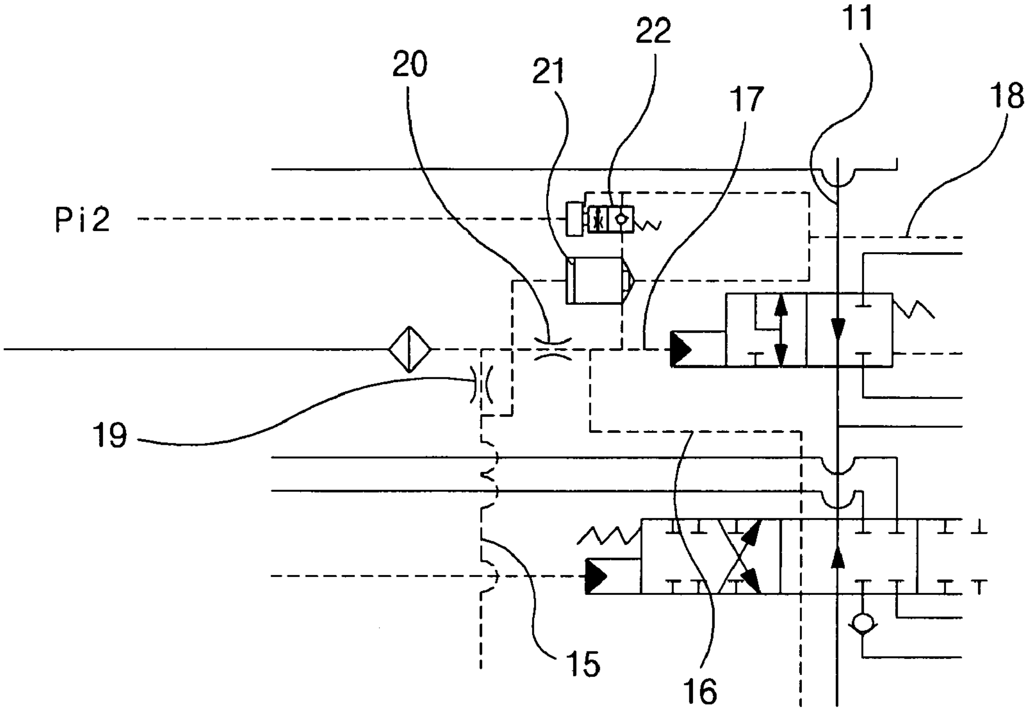
FIG. 4 is an enlarged view of a portion "B" illustrated in FIG. 3.
Figure 5:
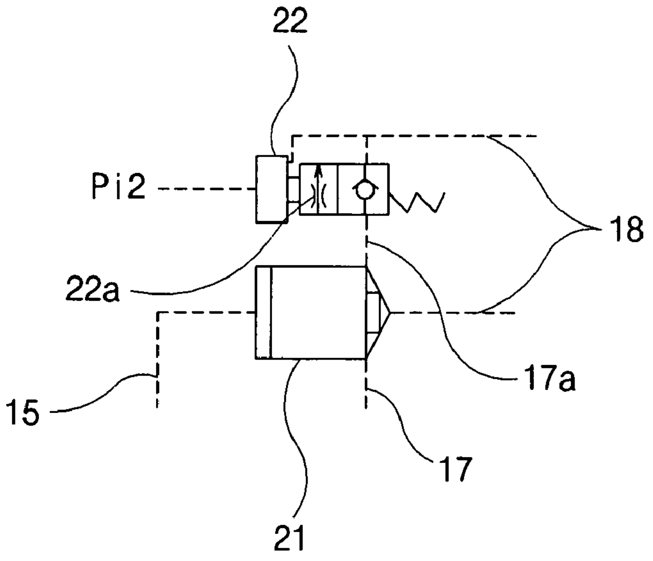
FIG. 5 is an enlarged view of a main part of FIG. 4.

As illustrated in FIGS. 3 to 5, a hydraulic circuit for construction equipment according to an embodiment of the present invention includes first to fourth hydraulic pumps P1, P2, P3, and P4 connected to and driven by an engine; first switching valves 1 and 2 composed of valves installed in a flow path of the first hydraulic pump P1 and shifted to control hydraulic fluid fed to working devices such as a boom, an arm, and the like; second switching valves 5 and 6 composed of valves installed in a flow path of the second hydraulic pump P2 and shifted to control hydraulic fluid fed to the working devices such as the boom, the arm, and the like; third switching valves 7 and 8 composed of valves installed in a flow path of the third hydraulic pump P3 and shifted to control hydraulic fluid fed to working devices such as a swing device or an option device; fourth switching valves 3 and 4 composed of valves installed on upstream sides of the flow paths of the first and second hydraulic pumps P1 and P2, respectively, and shifted to control the hydraulic fluid fed to left and right traveling devices; a confluence switching valve 9 installed on a downstream side of the flow path of the third hydraulic pump P3 and shifted to supply a part of the hydraulic fluid from the third hydraulic pump P3 to the working devices on the first hydraulic pump side P1 through a first confluence line 12 and to the working devices on the second hydraulic pump side P2 through a second confluence line 13, in response to a pilot signal pressure formed in a signal line 17 connected to the fourth hydraulic pump P4; a signal line 15 for the traveling devices which is connected to the signal line 17 for the confluence switching valve and in which a signal pressure is formed when the fourth switching valves 3 and 4 for the traveling devices are shifted; signal lines 16 for the working devices which are connected a downstream side of a second throttling part 21 installed in the signal line 17 for the confluence switching valve and in which a signal pressure is formed when the first and second switching valves 1, 2, 5, and 6 for the working devices connected to the first and second hydraulic pumps P1 and P2, respectively, are shifted; a first valve 21 having one end connected to the signal line 15 for the traveling device and the other hand connected to an intersection between the signal line 17 for the confluence switching valve and a tank line 18; and a second valve 22 installed to open/close a flow path 17*a* between the signal line 17 and the tank line 18, shifted to open the flow path 17*a* to discharge pressure formed in the signal line 17 to the tank line 18, in response to a supply of a pilot signal pressure Pi2, and shifted to block the flow path 17*a* to form the signal pressure in the signal line 17 when the pilot signal pressure Pi2 is not supplied thereto.

At this time, a pilot signal pressure for shifting the third switching valves 7 and 8 is used as the pilot signal pressure Pi2 for shifting the second valve 22.

The second valve 22 further includes an orifice 22*a* formed in a spool in a position where the flow path 17*a* is open when the second valve 22 is shifted in response to the supply of the signal pressure thereto, so that an abrupt shifting of the first valve 21 which may occur during the shifting of the second valve 22 is prevented.

Figure 1:
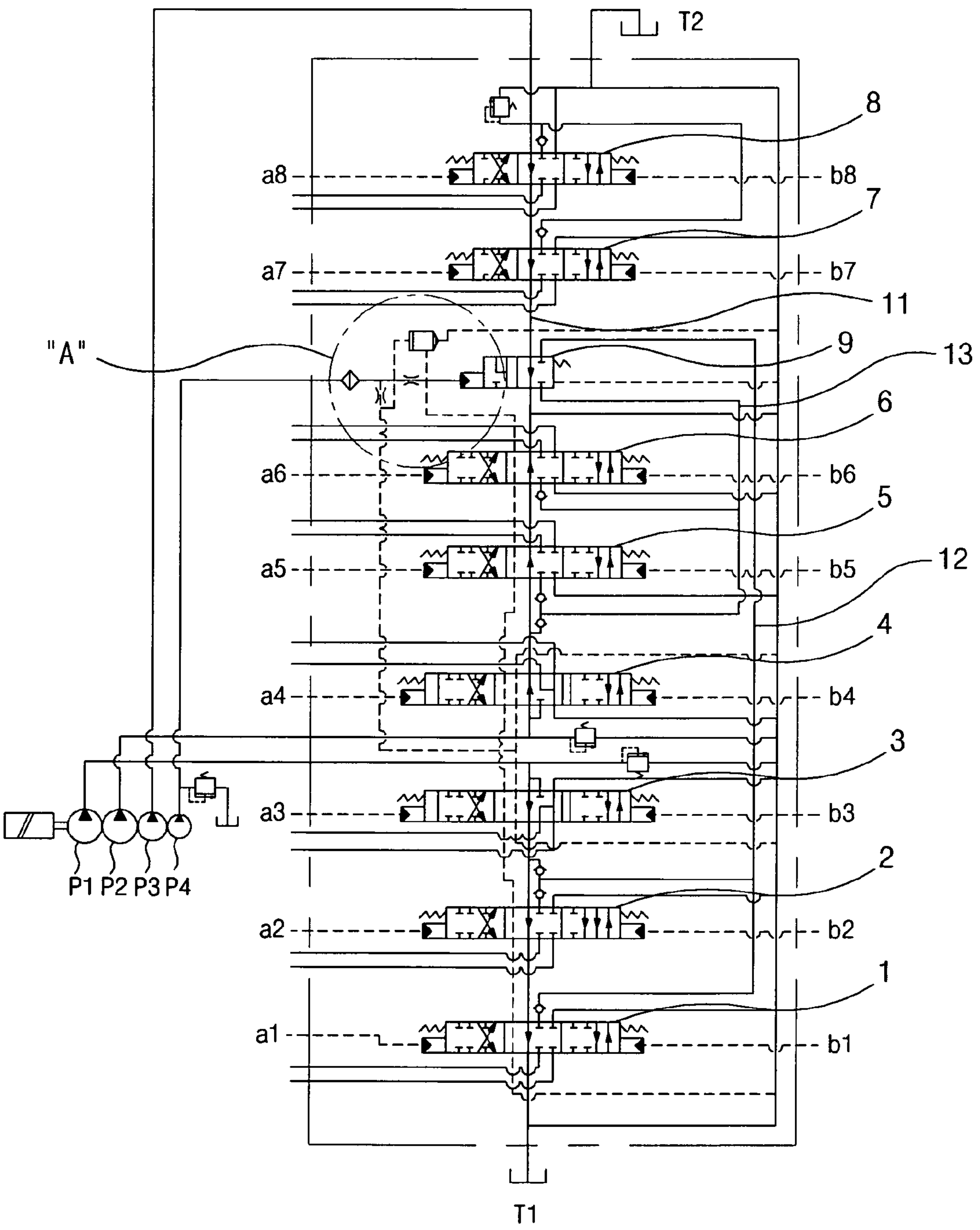
Fig. 1 Prior Art
FIG. 1 is a circuit diagram of a conventional hydraulic circuit.
Figure 2:
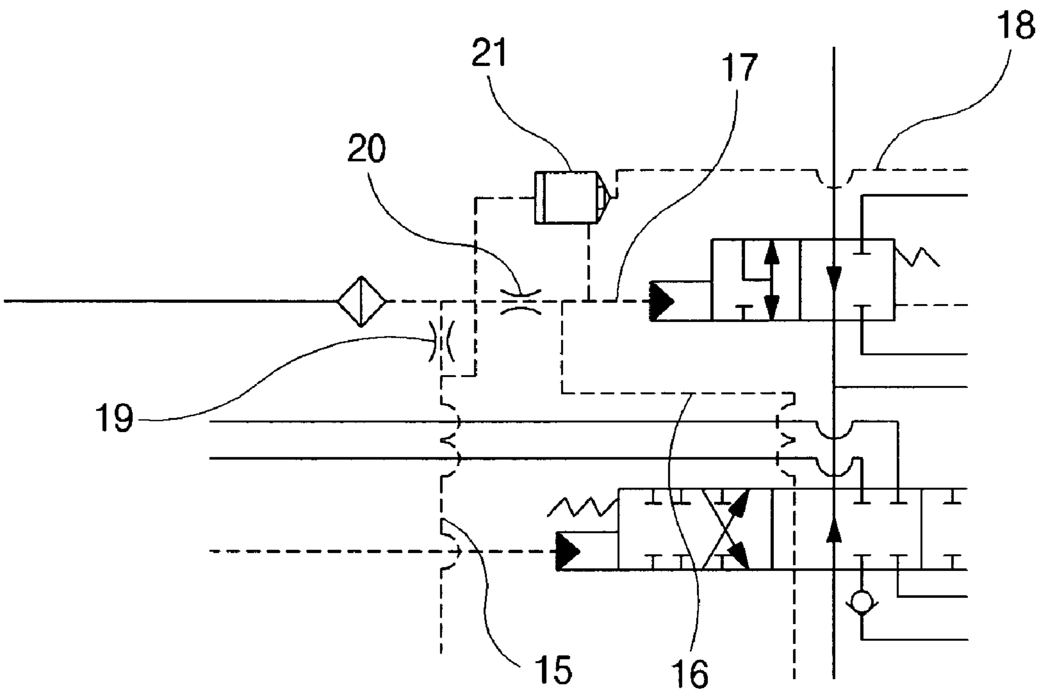
Fig. 2 Prior Art
FIG. 2 is an enlarged view of a portion "A" illustrated in FIG. 1.

Since the construction, except for the second valve 22 installed to open the flow path 17*a* between the first valve 21 and the tank line 18 when it is shifted in response of a supply of the pilot signal pressure Pi2, is substantially the same as the conventional hydraulic circuit as illustrated in FIGS. 1 and 2, and thus the detailed description thereof will be omitted. The same drawing reference numerals are used for the same elements across various figures.

Hereinafter, the operation of the hydraulic circuit for construction equipment according to an embodiment of the present invention will be described with reference to the accompanying drawings.

As illustrated in FIGS. 3 to 5, when the fourth switching valves 3 and 4 for the traveling devices are shifted and at least one of the first and second switching valves 1, 2, 5, and 6 is shifted, the confluence switching valve 9 is shifted in the right direction, as shown in the drawing, by the signal pressure formed in the signal line 17 for the confluence switching valve.

Accordingly, a part of the hydraulic fluid from the third hydraulic pump P3 joins the working devices connected to the first switching valves 1 and 2 through the first confluence line 12. Also, a part of the hydraulic fluid from the third hydraulic pump P3 joins the working devices connected to the second switching valves 5 and 6 through the second confluence line 13.

At this time, the pressure formed in a center bypass 11 connected to the third hydraulic pump P3 is equal to the load pressure formed in the first and second switching valves 1, 2, 5, and 6 connected to the first and second hydraulic pumps P1 and P2, respectively.

Accordingly, when the third switching valves 7 and 8 are shifted to drive a swing device or an option device, the swing device may abruptly operate due to the load pressure formed in the center bypass 11.

At this time, the pilot signal pressure Pi2 that is equal to the signal pressure for driving the third switching valves 7 and 8 is supplied to the second valve 22, and thus an inner spool is shifted in the right direction as shown in the drawing.

When the second valve 22 is shifted, the flow path 17*a* connected to the signal line 17 is connected to the tank line 18, and thus the hydraulic pressure formed in the signal line 17 is discharged to the hydraulic tank. AT this time, an abrupt shifting of the first valve 21 is prevented by the orifice 22*a* formed in the spool of the second valve 22.

That is, the signal pressure is not formed in the signal line 17, and thus the confluence switching valve 9 is returned to its initial neutral position by an elastic restoring force of a valve spring. Accordingly, the center bypass 11 connected to the third hydraulic pump P3 is connected to the tank line.

Accordingly, even if the third switching valves 7 and 8 are shifted, the abrupt operation of the swing device can be prevented.

Figure 6:
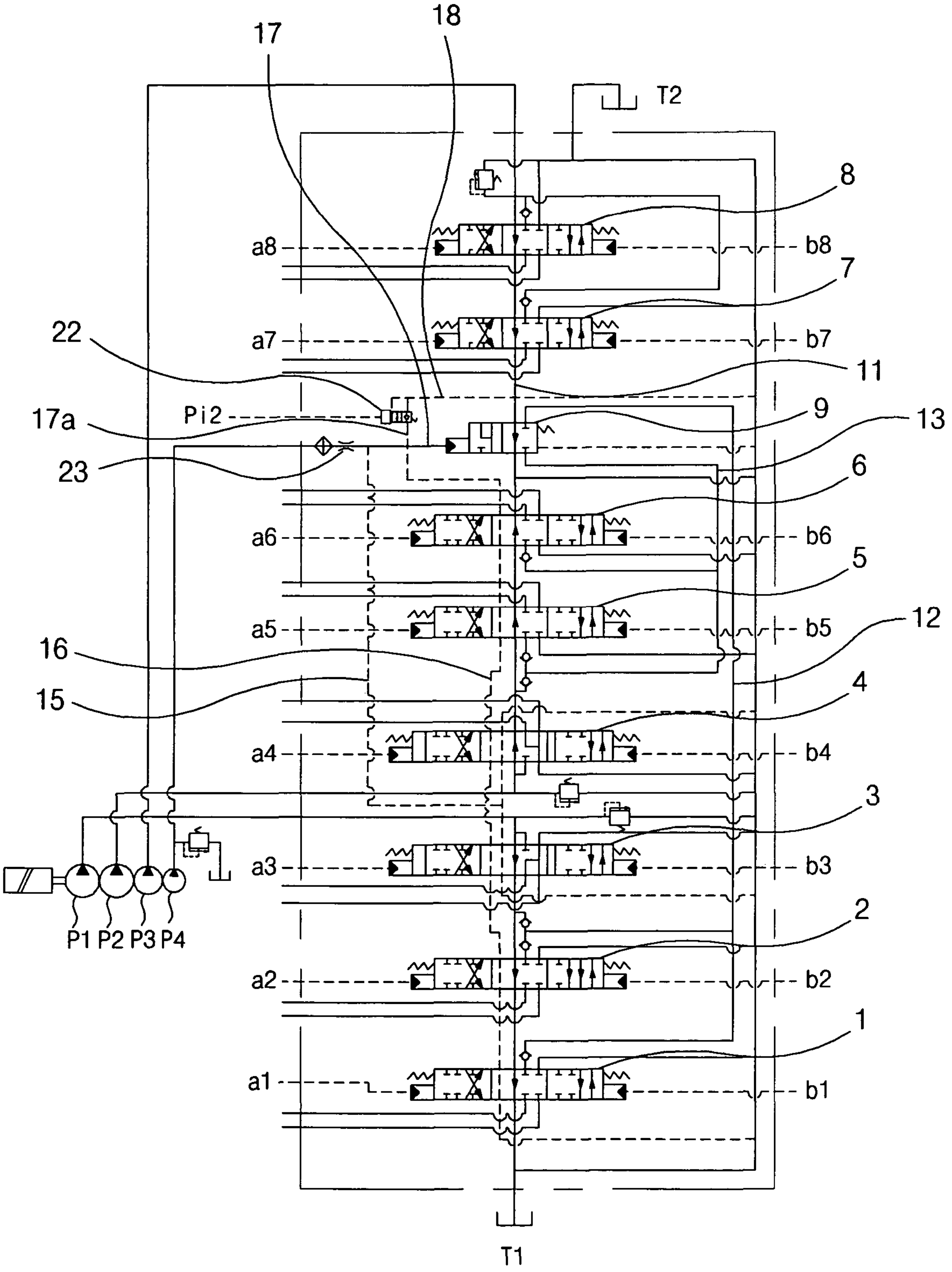
FIG. 6 is a circuit diagram of a hydraulic circuit for construction equipment according to another embodiment of the present invention.

As illustrated in FIG. 6, a hydraulic circuit for construction equipment according to another embodiment of the present invention includes first to fourth hydraulic pumps P1, P2, P3, and P4; first switching valves 1 and 2 composed of valves installed in a flow path of the first hydraulic pump P1 and shifted to control hydraulic fluid fed to working devices such as a boom, an arm, and the like; second switching valves 5 and 6 composed of valves installed in a flow path of the second hydraulic pump P2 and shifted to control hydraulic fluid fed to the working devices such as the boom, the arm, and the like; third switching valves 7 and 8 composed of valves installed in a flow path of the third hydraulic pump P3 and shifted to control hydraulic fluid fed to working devices; fourth switching valves 3 and 4 composed of valves installed on upstream sides of the flow paths of the first and second hydraulic pumps P1 and P2, respectively, and shifted to control the hydraulic fluid fed to left and right traveling devices; a confluence switching valve 9 installed on a downstream side of the flow path of the third hydraulic pump P3, connected to the fourth hydraulic pump P4, and shifted to supply the hydraulic fluid from the third hydraulic pump P3 to the working devices on the first hydraulic pump side P1 through a first confluence line 12 and to the working devices on the second hydraulic pump side P2 through a second confluence line 13, in response to a pilot signal pressure Pi formed in a signal line 17 in which a third throttling part 23 is installed; a signal line 15 for the traveling devices which is connected to the signal line 17 on a downstream side of the third throttling part 23 installed in the signal line 17 for the confluence switching valve and in which a signal pressure is formed when the fourth switching valves 3 and 4 for the traveling devices are shifted; signal lines 16 for the working devices which are connected to the signal line 17 for the confluence switching valve and in which a signal pressure is formed when the first and second switching valves 1, 2, 5, and 6 for the working devices are shifted; and a second valve 22 installed to be able to open/close a flow path 17*a* between the signal line 17 for the confluence switching valve and a tank line 18, shifted to open the flow path 17*a* to discharge pressure formed in the signal line 17 to the tank line 18, in response to a supply of a pilot signal pressure Pi2, and shifted to block the flow path 17*a* to form the signal pressure in the signal line 17 when the pilot signal pressure is not supplied thereto.

A pilot signal pressure for shifting the third switching valves 7 and 8 is used as the pilot signal pressure Pi2 for shifting the second valve 22.

Accordingly, by installing the second valve 22 in the flow path between the signal line 17 and the tank line 18, it is not required to use the second throttling part 20 and the first valve 21 installed in the hydraulic circuit according to an embodiment of the present invention, and thus the number of constituent elements can be reduced to reduce the manufacturing cost.

Since the construction, except for the signal line 15 for the traveling devices and the signal line 16 for the working devices connected to the signal line 17 for the confluence switching valve, and the second valve 22 installed between the signal line 17 and the tank line 18 and shifted to open the flow path 17*a* to discharge the hydraulic fluid of the signal line 17 to the hydraulic tank, is substantially the same as the construction according to an embodiment of the present invention as illustrated in FIGS. 3 to 5, and thus the detailed description thereof will be omitted. The same drawing reference numerals are used for the same elements across various figures.

As described above, the hydraulic circuit for construction equipment according to the embodiments of the present invention has the following advantages.

The shifting of the confluence switching valve installed in the hydraulic circuit can be optionally controlled, and thus when the switching valve for the swing device is shifted in a state that the switching valves for the traveling devices and the working devices have been shifted, an abrupt rotation of the swing device can be prevented to improve the manipulation and safety.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A hydraulic circuit for construction equipment comprising:

first to fourth hydraulic pumps;

first switching valves composed of valves installed in a flow path of the first hydraulic pump and shifted to control hydraulic fluid fed to working devices;

second switching valves composed of valves installed in a flow path of the second hydraulic pump and shifted to control hydraulic fluid fed to the working devices;

third switching valves composed of valves installed in a flow path of the third hydraulic pump and shifted to control hydraulic fluid fed to working devices;

fourth switching valves composed of valves installed on upstream sides of the flow paths of the first and second hydraulic pumps, respectively, and shifted to control the hydraulic fluid fed to left and right traveling devices;

a confluence switching valve installed on a downstream side of the flow path of the third hydraulic pump and shifted to supply the hydraulic fluid from the third hydraulic pump to the working devices on the first hydraulic pump side and to the working devices on the second hydraulic pump side, in response to a pilot signal pressure formed in a signal line connected to the fourth hydraulic pump;

a signal line for the traveling devices which is connected to the signal line for the confluence switching valve and in which a signal pressure is formed when the fourth switching valves for the traveling devices are shifted;

signal lines for the working devices which are connected to the signal line for the confluence switching valve and in which a signal pressure is formed when the first and second switching valves for the working devices are shifted;

a first valve having one end connected to the signal line for the traveling device and the other end connected to an intersection between the signal line for the confluence switching valve and a tank line; and a second valve installed in a flow path between the first valve and the tank line, shifted to open the flow path to discharge pressure formed in the signal line for the confluence switching valve to the tank line, in response to a supply of a signal pressure formed when the third switching valves for the working devices are shifted, and shifted to block the flow path to form the signal pressure in the signal line for the confluence switching valve when the signal pressure formed when the third switching valves for the working devices are shifted is not supplied thereto.

2. The hydraulic circuit of claim 1, wherein a first throttling part is installed on an upstream side of the signal line for the traveling devices connected to the signal line for the confluence switching valve, and the signal line for the working devices is connected to a downstream side of a second throttling part installed in the signal line for the confluence switching valve.

3. The hydraulic circuit of claim 1, wherein the second valve further comprises an orifice formed in a spool in a position where the flow path is open when the second valve is shifted in response to the supply of the signal pressure thereto.

4. The hydraulic circuit of claim 1, wherein the working device connected to the third switching valve is a swing device or an option device.

5. A hydraulic circuit for construction equipment comprising:

first to fourth hydraulic pumps;

first switching valves composed of valves installed in a flow path of the first hydraulic pump and shifted to control hydraulic fluid fed to working devices;

second switching valves composed of valves installed in a flow path of the second hydraulic pump and shifted to control hydraulic fluid fed to the working devices;

third switching valves composed of valves installed in a flow path of the third hydraulic pump and shifted to control hydraulic fluid fed to working devices;

fourth switching valves composed of valves installed on upstream sides of the flow paths of the first and second hydraulic pumps, respectively, and shifted to control the hydraulic fluid fed to left and right traveling devices;

a confluence switching valve installed on a downstream side of the flow path of the third hydraulic pump, connected to the fourth hydraulic pump, and shifted to supply the hydraulic fluid from the third hydraulic pump to the working devices on the first hydraulic pump side and to the working devices on the second hydraulic pump side, in response to a pilot signal pressure formed in a signal line in which a third throttling part is installed;

a signal line for the traveling devices which is connected to a downstream side of the third throttling part installed in the signal line for the confluence switching valve and in which a signal pressure is formed when the fourth switching valves for the traveling devices are shifted;

signal lines for the working devices which are connected to the signal line for the confluence switching valve and in which a signal pressure is formed when the first and second switching valves for the working devices are shifted; and a second valve installed to open/close a flow path between the signal line for the confluence switching valve and a tank line, shifted to open the flow path to discharge pressure formed in the signal line for the confluence switching valve to the tank line, in response to a supply of the signal pressure, and shifted to block the flow path to form a signal pressure formed when the third switching valves for the working devices are shifted in the signal line for the confluence switching valve when the signal pressure formed when the third switching valves for the working devices are shifted is not supplied thereto.

* * * * *